United States Patent [19]

Harrison

[11] Patent Number: 4,487,105
[45] Date of Patent: Dec. 11, 1984

[54] FOUR POSITION CONTROL VALVE FOR A PNEUMATICALLY OPERATED SERVOMOTOR

[75] Inventor: Gregory K. Harrison, South Bend, Ind.

[73] Assignee: The Bendix Corporation, Southfield, Mich.

[21] Appl. No.: 492,322

[22] Filed: May 6, 1983

Related U.S. Application Data

[63] Continuation-in-part of Ser. No. 205,480, Nov. 10, 1980, abandoned.

[51] Int. Cl.³ ............................................... F15B 9/10
[52] U.S. Cl. .............................. 91/369 A; 91/376 R
[58] Field of Search ............ 91/369 A, 369 B, 369 R, 91/376 R; 60/554

[56] References Cited

U.S. PATENT DOCUMENTS

| 3,452,646 | 7/1969 | Abbott et al. | 91/369 A |
| 4,358,990 | 11/1982 | Takeuchi | 91/369 A |

FOREIGN PATENT DOCUMENTS

| 156982 | 12/1979 | Japan | 91/369 A |
| 63958 | 5/1980 | Japan | 91/369 A |
| 2046382 | 11/1980 | United Kingdom | 91/369 A |
| 2064690 | 6/1981 | United Kingdom | 91/369 A |
| 2065809 | 7/1981 | United Kingdom | 91/369 A |

*Primary Examiner*—Paul E. Maslousky
*Attorney, Agent, or Firm*—Leo H. McCormick, Jr.; Ken C. Decker

[57] ABSTRACT

A retainer 226 for holding a control valve 656 of a servomotor 42 in a bore 90 of a hub 78. The hub 78 which is attached to a movable wall 56 has first 92 and second 96 passages that connect the bore to first 86 and second 88 chambers in the servomotor 42. The retainer 226 limits the movement of the control valve 656 in the bore 90 to establish a full release position whereby the pressure of the fluid in the first 86 and second 88 chambers equalize. In response to an input force, the control valve 656 moves to an actuation position where fluid under pressure is communicated to the second chamber 88 to create a pressure differential across the movable wall 56. The pressure differential acts on the movable wall 56 to develop an output force corresponding to the input force. On termination of the input force, the control valve 656 moves to the full release position where the fluid pressure equalization occurs. As equalization occurs, the retainer 226 cooperates with the hub 78 to allow the control valve 656 to move from the full release position to a fixed rest position adjacent the actuation position to reduce the valve travel required to reach the actuation position when an input force is applied to the control valve 656.

8 Claims, 14 Drawing Figures

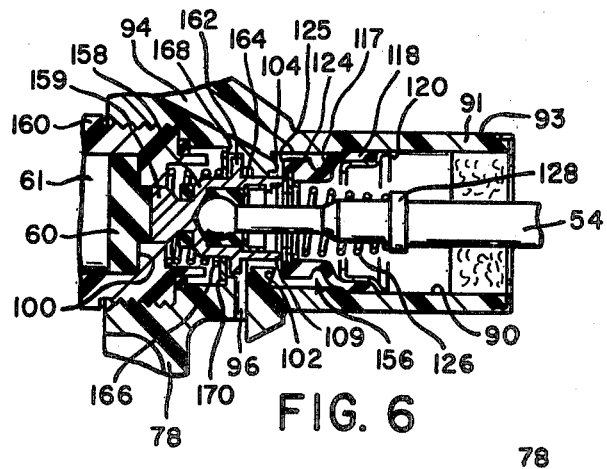

FOUR POSITION CONTROL VALVE FOR A PNEUMATICALLY OPERATED SERVOMOTOR

This application is a continuation-in-part of U.S. application Ser. No. 205,480 filed Nov. 10, 1980, now abandoned.

BACKGROUND OF THE INVENTION

This invention relates to a retainer which cooperates with a hub on a movable wall to allow a control valve to move between four distinct positions in the operation of a servomotor.

In known servomotors such as illustrated in U.S. Pat. Nos. 3,289,547 and 3,452,646, the operational control valve has three distinct operational positions, i.e., full release, lap and applied. In response to an operator input, the control valve moves from the full release to lap and into the applied position to allow a pressure differential to be created and move a wall to develop a corresponding output force. When the resistance to movement of an output member by the output force is in balance with the input force, the control valve returns to the lap position. On termination of the input force, a return spring and the reaction force move the control valve to the full release position to allow the pressure differential to dissipate. The limit to which the return spring and reaction force can move the control valve is controlled by a retainer such as the key shown in U.S. Pat. No. 3,125,003 and the step on the housing shown in U.S. Pat. No. 3,289,547. On termination of the input force it is important that the control valve move to the fully released position as soon as possible to allow the operational pressure differential to dissipate and thereby terminate the brake application. Unfortunately, in order to effect a brake application, the control valve must move from the fully released position through the lap position to the actuation position. This movement causes a delay in the response time from which an operator decides to make as brake application and an actual brake application occurs. A reduction in response time can reduce the overall stopping distance which could result in preventing damage to property as well as loss of lives.

SUMMARY OF THE INVENTION

It is an advantageous effect of this invention to provide a retainer for a control valve to establish four distinct operational positions, fully released, rest, lap and actuation. The rest position which is between fully released and lap provides for a reduction in the valve travel required to effect a brake application in response to an input force.

The control valve is held in the hub of a movable wall by a retainer system. The retainer system establishes the limits of movement of the control valve to the fully released position. Once the operational pressure differential across the wall dissipates, a rest pressure differential across the control valve moves the control valve to the rest position. A hold-off spring, which is part of the retainer member, engages a stop on the hub to position the control valve adjacent the lap position to establish the rest position. As in the fully released position, the control valve in the rest position allows the fluid pressure on both sides of the movable wall to remain equal. In addition, the hold-off spring provides sufficient resistance to movement of the control valve to assure that the servomotor is not accidentally actuated by the rest pressure differential. The distance between the rest position and the lap position can be adjusted through the selective caging of the hold-off spring. However, the response time required to effect a brake application is always less than with current brake boosters since the valve travel required to go from the rest position to the actuation positin is less than going from fully released to the actuation position. In addition, the operator should experience better control over the development of the output force since the operational feedback is immediately transmitted to the control valve.

In another embodiment of this invention, the key which retains the plunger of the control valve in the hub, engages the rear housing of the servomotor as the return spring urges the movable wall toward the rear housing to hold the control valve stationary as the movable wall returns to its rest position. With the control valve stationary, the distance between the control valve and its seat on the hub is correspondingly reduced. This reduction in distance between the control valve and its seat reduces the valve travel required to move the valve by an input member when an operator desires to effect a brake application.

It is an object of this invention to provide a control valve with a retention arrangement whereby the travel required to operate a servomotor is reduced.

It is a further object of this invention to provide a servomotor with a retention arrangement whereby a control valve is moved from a fully released position to a ready position adjacent a lap position by the engagement with the housing of the servomotor to reduce the distance required by an input member to move the control valve in effecting a brake application.

It is still a further object of this invention to provide a servomotor with a retention whereby a control valve is moved from a fully released position to an actuation position by a pressure differential to reduce the distance required by an input member to move the control valve in response to an input force in effecting a brake application.

These and other objects should be apparent from reading this specification while viewing the drawings.

BRIEF DESCRIPTION OF THE DRAWINGS

FIG. 6 is a sectional view of another embodiment of a control valve for use in a servomotor as disclosed in FIG. 1 in a fully released position;

FIG. 7 is a sectional view of another retention arrangement for the plunger of the control valve shown in FIG. 6;

FIG. 8 is a sectional view of another retention arrangement for the plunger of the control valve shown in FIG. 6;

FIG. 9 is a sectional view of another retention arrangement for the plunger of the control valve shown in FIG. 6;

FIG. 10 is a sectional view of another retention arrangement for the plunger of the control valve shown in FIG. 6;

DETAILED DESCRIPTION OF THE INVENTION

Figure 1:
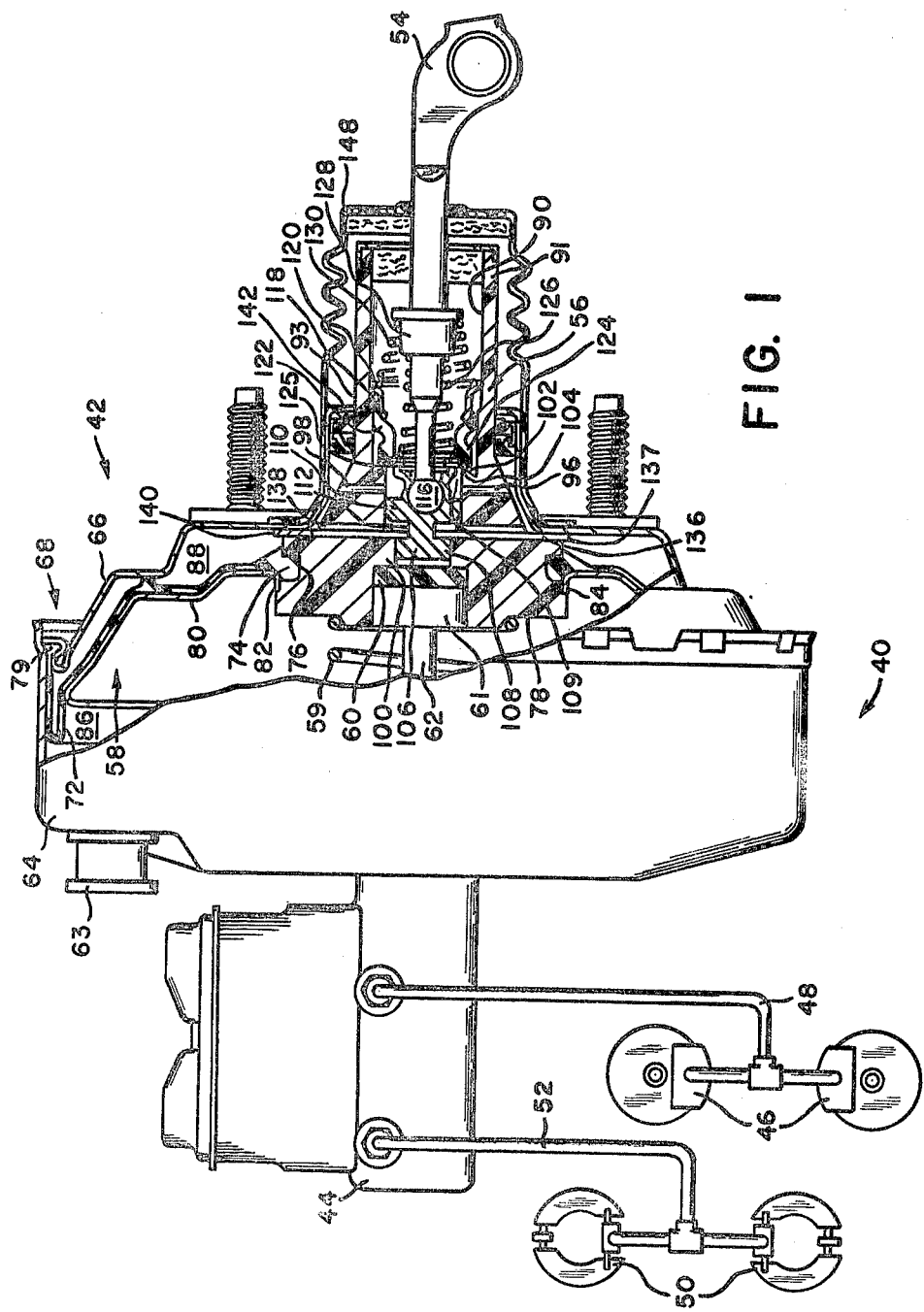
FIG. 1 is a schematic illustration of a brake system with a sectional view of a servomotor made according to the principles of this invention.

The brake system 40 shown in FIG. 1 has a power assist servomotor 42 connected to a master cylinder 44. The master cylinder 44 is connected to the front brakes 46 by a conduit 48 and to the rear brake 50 by a conduit 52. In response to an input force applied to push rod 54 by a brake pedal, control valve 56 is moved from its rest position through a lap position and into an actuation position whereby an operational pressure differential is created across a movable wall 58 in servomotor 42. The operational pressure differential acts on the movable wall 58 to develop an output force that is transmitted through disc 60 into push rod 62. The output force moves the wall 58 and push rod 62 to provide master cylinder 44 of a type fully disclosed in U.S. Pat. No. 3,818,706 with an operational force that pressurizes fluid to provide the front and rear brakes 48 and 50 with a force to effect a brake application corresponding to the input force applied to push rod 54. On termination of the input force, return spring 59 urges the movable wall 58 towards the rest position as the pressure differential dissipates.

In more particular detail, the servomotor 42 shown in FIG. 1, has a housing formed by a front shell 64 being connected to a rear shell 66 by a lock arrangement 68. The lock arrangement 68 holds a first bead 79 of diaphragm 72 between the ends of the front and rear shells 64 and 66.

The diaphragm 72 which is part of the movable wall 58 has a bead 74 which holds flange 82 of backing plate 80 against shoulder 84 snaps into groove 76 on hub 78 to separate a resulting front chamber 86 from a rear chamber 88.

Figure 4:
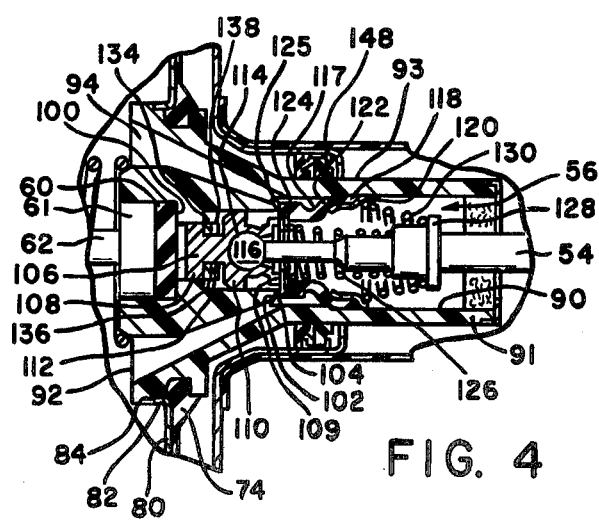
FIG. 4 is a view taken along line 4—4 of FIG. 1 showing the passages through which the front and rear chambers in the servomotor are connected.

As best shown in FIGS. 1 and 4, hub 78 has a projection 91 that extends through opening 93 in the rear shell 66. The hub has an axial bore 90 with passages 92 and 94 connected to front chamber 86 and passages 96 and 98 connected to rear chamber 88. A first shoulder 100 in hub 78 positions disc 60 and head 61 on push rod 62 in bore 90 and a second shoulder 102 adjacent the exit of passages 92 and 94 forms a vacuum seat 104 for control valve 56.

Control valve 56 which is located in bore 90 of projection 91 has a plunger 106 with a first bearing surface 108 separated from a second bearing surface 110 by a stem 112. Plunger 106 has a socket 114 which receives ball 116 on the end of push rod 54. A poppet 117 has a first end 118 fixed to projection 91 by a retainer 120, a flexible body 122 and a second end 124. A first spring 126 located between retainer 128 and the second end 124 of poppet 117 urges face 125 toward vacuum seat 104 and atmospheric seat 109 on plunger 106. A second spring 130 located between retainers 120 and 128 urge the plunger 108 away from the reaction disc 60.

Figure 5:
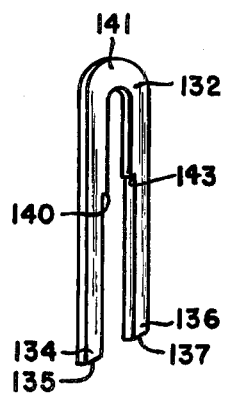
FIG. 5 is a perspective view of the retention key that holds the control valve in the hub of the servomotor of FIG. 1.

The plunger 106 is retained in bore 90 by a key 132 shown in FIG. 5. Key 132 has legs 134 and 136 that are located in slot 138 in hub 78. Sholders 140 and 143 on key 132 engage stem 112 such that both ends 135 and 137 of legs 134 and 136 and yoke 141 are located outside of hub 78. Slot 138 has a dimension which is equal to the thickness of the key 132 plus the distance required to move the end 125 of poppet 117 from the fully released position to the rest position and still provide flow communication between the front chamber 86 and rear chamber 88 by way of passages 92 and 94, bore 90 and passages 96 and 98.

A boot 148 attached to the rear shell 66 surrounds projection 91 to prevent contaminants from scoring either seal 142 or the peripheral surface 93 of projection 91 such that a leak path could be produced between the rear chamber 88 and the surrounding environment.

The control valve 56 shown in FIG. 1 is in the rest position which is located adjacent the lap position. In the rest position, vacuum from a source is communicated through check valve 63 into chamber 86 to evacuate air from chamber 88 by way of passages 96 and 98, bore 90 and passages 92 and 94.

In response to an input force on push rod 54, plunger 108 moves toward disc 60. On initial movement of plunger 108, spring 126 moves end 125 into contact with vacuum seat 104 to interrupt communication through passages 92 and 94 into bore 90. Further movement of plunger 108 moves face 109 away from end 125 to allow air present in bore 90 to flow to chamber 88 by way of passages 96 and 98. With air in chamber 88 and vacuum present in chamber 86 a pressure differential is created across wall 58. This pressure differential acts on diaphragm 72 and backing plate 80 to develop an output force that is transmitted through shoulder 84 into hub 78 for distribution to head 61 by disc 60. The resistance to movement of push rod 62 by the development of a hydraulic pressure in the master cylinder 44 to effect a brake application is transmitted through disc 60 into end 107 of plunger 106 for balancing the input force applied to push rod 54.

Figure 2:
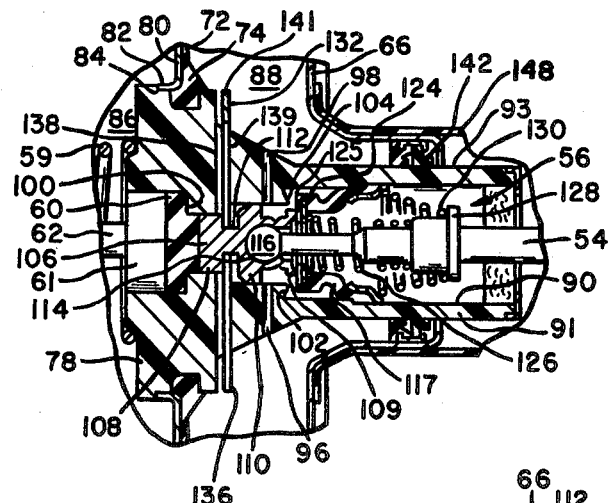
FIG. 2 is a sectional view of a portion of the servomotor shown in FIG. 1 showing the control valve in the fully released position.

On termination of the input force to push rod 54, the reactionary force on disc 60 moves plunger 108 to a full released position as shown in FIG. 2. In this position, vacuum in chamber 86 evacuates air from chamber 88 by way of passages 96 and 98, bore 90 and passages 92 and 94. In this position, key 132 engages the bottom 139 of slot 138 to limit the distance that the control valve is moved. With face 125 away from seat 104, the air in chamber 88 is rapidly evacuated through the dual passages 96 and 98 to allow return spring 59 to urge the movable wall 58 and hub 78 attached thereto toward the rear shell 66.

Figure 3:
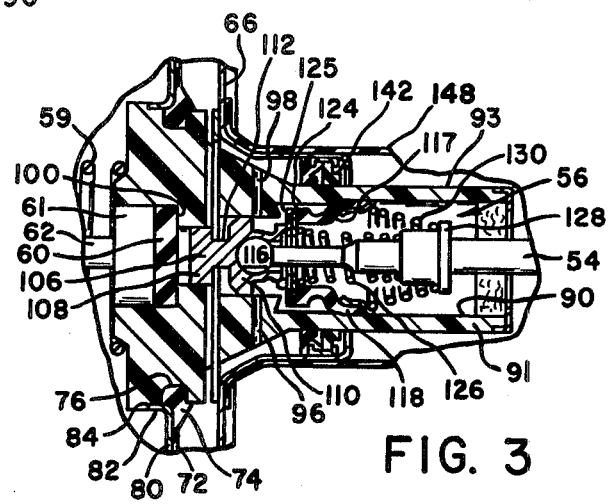
FIG. 3 is a sectional view of the control valve shown in FIG. 2 on initiation of the transfer from the fully released position to the rest position.

As the movable wall 58 approaches the rear shell 66, yoke 140 and ends 135 and 136 of key 132 engage the rear shell 66 and hold the plunger 106 in a stationary position as illustrated in FIG. 3. Thereafter, the return spring 59 continues to urge the movable wall 58 toward the rear shell 66. The slot 138 in hub 78 allows the movable wall 58 to move toward the rear shell 66 as shown in FIG. 1. As the hub 78 moves with respect to key 132, end 125 of poppet 117 moves toward vacuum seat 104 to its rest position adjacent the lap position in order to reduce the valve travel required to effect a brake application in response to an output force on push rod 54.

Thus, the valve 56 shown in FIG. 1 has four distinct operational positions, i.e., fully released, rest, lap and acutation. By reducing the valve travel required to initiate the actuation of the servomotor, the operational time to effect a brake application should be reduced and permit a vehicle to stop in a shorted distance.

In addition, the operation should experience better control over the development of the output force since the operational feedback through reaction disc 60 is immediately transmitted to push rod 54.

The four operational positions of the control valve 56 can be achieved with different structure depending on the operational characteristics desired. The structure shown in FIG. 1 provides for positive movement of the poppet 117 from the fully released to the rest position. Under some circumstances it should be sufficient to allow a pressure differential which develops across the poppet 117 to move the plunger 108 and push rod 54 from the fully released to the rest position.

The elements in the structural embodiments for the control valve and retention arrangement shown in FIGS. 6 through 14 that are the same as in FIG. 1 are identified by the same number.

The control valve 156 shown in FIG. 6 has a plunger 158 that is retained in hub 78 by an end cap 160. A rib 162 on plunger 158 engages a shoulder 164 to limit travel of face 125 on end 124 of poppet 117 away from seat 104 by the action of disc 60 on end 159 to establish the fully released position. A spring 166 which surrounds plunger 158 is caged between end cap 160 and a disc 170 which engages shoulder 168 on hub 78.

The distance between shoulders 164 and 168 less the thickness of rib 162 is equal to the distance that end 125 of poppet 117 travels between fully released and rest position.

In operation as with valve 56 in FIG. 1, an input force applied to push rod 54 moves plunger 158 to compress spring 166 and allow spring 126 to ruge face 125 against seat 104 and interrupt fluid communication between the front and rear chambers 86 and 88 and allow air to enter the rear chamber 88 and develop an operational pressure differential. This operational pressure differential acts on wall 58 to develop an output force that is carried through disc 60 into head 61 of push rod 62. The resistance to movement of push rod 62 provides a reactionary force that causes disc 60 to deform and engage face 159 on plunger 158.

Immediately on termination of the input force on push rod 54, spring 166 and the reactionary force on disc 60 act on plunger 158 to move end 109 of plunger 158 into engagement with face 125 and move face 125 away from seat 104 to allow air to be evacuated into chamber 86 from chamber 88 by way of passage 96, bore 90 and passage 94 to eliminate the operational pressure differential. When disc 170 engages shoulder 168, reaction disc 60 moves the plunger 158 and poppet 117 to the fully released position shown in FIG. 6. While the operational pressure differential has been eliminated through the equalization of the fluid pressure in chambers 86 and 88, return spring 59 urges hub 78 against the rear shell 66. At the same time, a pressure differential is created across plunger 158 and poppet 117 that moves face 125 toward seat 104. However, before face 125 engages seat 104, rub 162 engages disc 170 to establish a rest position adjacent the lap and before the actuation positions for valve 156. Thereafter the input force need only move the plunger from the rest position end through the lap position before actuation of the servomotor 42 occurs to effect a brake application.

In order to simplify the retention means for retaining the four position control valve 56 in hub 78, various modifications of the caging of the spring between the plunger and disc were evaluated. Such modifications are illustrated in FIGS. 7, 8, 9, 10 and 11.

In FIG. 7, the plunger 208 has a cylindrical body with a first diameter 210 that extends from the annular atmospheric seat 109 to a shoulder 214, a second diameter 212 that extends from shoulder 214 to a shoulder 216, a third diameter 220 that extends from shoulder 216 to shoulder 222 and a fourth diameter 223 that extends from shoulder 222 to end 224. Plunger 208 and sleeve 226 are joined together and cooperate with hub 78 to position poppet 118 with respect to seat 104. In more detail, a sleeve 226 has a first end 228 that is held tight against shoulder 222 on plunger 208 by a head 230 formed on end 224 of the plunger 208. A spring 234 is caged between a disc 232 and shoulder 214. The caged free length of spring 234 is such that when the control valve 156 is in the rest position, disc 232 engages shoulder 244 and face 125 on poppet 117 is held away from seat 104.

In operation, an input force applied to push rod 54 overcomes spring 234 and moves face 109 away from seat 125 to allow air to flow through passage 96 and develop the operational pressure differential. On termination of the input force, the reactionary force on disc 60 acts on end 236 of sleeve 226 to move plunger 208 and poppet 117 away from seat 104 until rib 238 engages shoulder or stop 240 on hub 78. When the operational pressure differential across the movable wall 58 dissipates, a pressure differential develops across plunger 208 and poppet 117 sufficient to move face 125 toward seat 104 to establish the rest position when disc 232 engages shoulder 244. In the rest position, fluid communication between chambers 86 and 88 is retained but the valve travel required to initiate communication between bore 90 and chamber 88 is reduced by a length equal to the difference between shoulder 240 and 244 and shoulders 222 and 241. Thus, the operational time required to effect a brake application should be correspondingly reduced. In addition, the operational feedback through the reaction disc 60 to plunger 208 is substantially immediate since the plunger 208 does not pass through the inactive portion of the valve travel experienced with current servomotor going from full released to lap.

In the retention arrangement illustrated in FIG. 8, plunger 308 has a cylindrical body with an annular rib 310 extending therefrom adjacent the atmospheric valve seat 109, and a groove 312 adjacent bearing surface 314. A key 316 located in slot 318 in hub 78 extends into bore 90 and engages the bottom of groove 312. A snap ring or keeper 320 attached to plunger 308 limits the movement of disc 326 by spring 324 toward groove 312. In operation an input force applied to push rod 54 moves plunger 308 and face 109 away from face 125 as spring 324 is compressed when disc 326 engages stop or shoulder 328. With face 109 unseated, air enters the rear chamber by way of bore 90 and passage 96 to create the operational pressure differential. This operational pressure differential acts on wall 58 to develop an output force corresponding to the input force applied to push rod 54. The resistance to movement of the output push rod 62 is carried through head 61 into disc 60. On termination of the input force, spring 324 and the reactionary force applied to disc 60 move plunger 308 and poppet 117 to the full release position shown by the position of plunger 308 in FIG. 8. In the fully released position, key 316 limits the movement of the plunger 308 away from head 61 to allow the fluid pressure in chambers 86 and 88 to equalize and allows the return spring 52 to move wall 58 to the rest position. Thereafter, a pressure differential across plunger 308 and poppet 117 move face 125 toward seat 104 until disc 326 engages stop 328 to define the rest position of valve 308 wherein valve travel required to actuate a power assist device is reduced.

In the retention arrangement shown in FIG. 9, the plunger 408 for the control valve has a cylindrical body with a groove 410 located between shoulders 412 and 414. The cylindrical body has a first diameter 416 which acts as a guide for spring 418 and a second diameter 420 with an end 422 that engages disc 60. A sleeve 424 which surrounds the first diameter 416 has an annular projection 426 that engages shoulder 412 to cage spring 418 between sleeve 424 and shoulder 428. A key 430 connected to hub 78 extends through bore 90 into a groove 410 on plunger 408.

In response to an input force on push rod 54, atmospheric seat 109 moves away from face 125 to allow air to enter the rear chamber 88 through bore 90 and passage 96. In moving to the actuation position, spring 418 is compressed as the input force moves end 422 on plunger 408 into engagement with the disc. As the output force develops through the pressure differential created by vacuum in chamber 86 and air in chamber 88, a reactionary force develops from the resistance to movement of push rod 62. This reactionary force which is carried through head 61 into disc 60 acts on end 422 to provide an operator with an indication of the force being produced in the servomotor.

On termination of the input force, spring 418 acts on sleeve 424 to move the sleeve into engagement with key 430. At the same time projection 426 engages rib 412 to aid the deformed disc 60 in moving plunger 408 and poppet 117 to the fully released position.

In the released position, air is evacuated from chamber 88 and eventually the pressure in chambers 86 and 88 equalizes. Thereafter, disc 60 returns to the shape illustrated in FIG. 9. At the same time, a pressure differential created across plunger 408 and poppet 117 moves face 125 toward seat 104 to position the control valve in the rest position when shoulder 412 engages projection 426. By moving from the fully released position to the rest position, valve travel required to actuate the servomotor is reduced.

In the retention arrangement shown in FIG. 10, the plunger 508 in the control valve has a stepped diameter 510 with a rib 512 located adjacent atmospheric seat 109. A spring 514 is caged between disc 516 and shoulder 518. The disc 516 is held in bore 90 by key 520 fixed to hub 78. A snap ring 522 attached to plunger 508 establishes limits through which the plunger 508 may move independent of spring 514.

In operation as with the other embodiments described above, spring 514 acts on disc 516 which engages shoulder 524 to move plunger 508 toward the fully released position. However, when disc 516 engages key 520, the reactionary force acting on disc 60 further moves the plunger 508 and poppet 117 until ring 52 engages disc 516 to define the fully released position where air is easily evacuated from the rear chamber 88. As air is evacuated from chamber 88, the pressure in chambers 86 and 88 equalizes to permit spring 52 to return the wall 58 toward its rest position adjacent the rear shell 66. As the pressure equalizes, a pressure differential acts on plunger 508 and poppet 117 to move face 117 toward seat 104. This pressure differential moves plunger 508 toward disc 60 until shoulder 524 engages disc 516 to establish the rest position for the control valve. Thus, as before the valve travel required to operate the servomotor by an input force is reduced by the amount that the pressure differential moves this plunger 508 from the fully released position.

Figure 11:
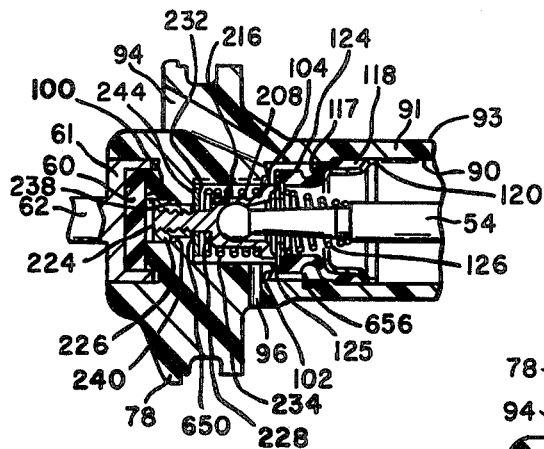
FIG. 11 is a sectional view of another embodiment of a control valve for a servomotor as disclosed in FIG. 1 in a rest position.
Figure 12:
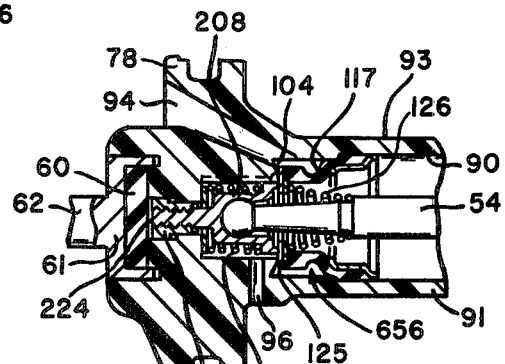
FIG. 12 is a sectional view of the control valve of FIG. 11 in a lap position.
Figure 14:
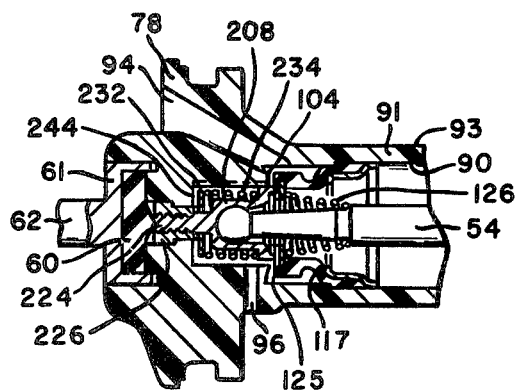
FIG. 14 is a sectional view of the control valve of FIG. 11 in a fully released position.

The control valve 656 shown in FIG. 11 in the rest position is similar in structure with the control valve shown in FIG. 7 with the exception of the sleeve 226 and plunger 208 of the retention means which have been modified to permit adjustment of the location of the rest position and/or fully released position of seat 125 of poppet 117 with respect to the vacuum seat 104. Plunger 208 is threaded between shoulder 228 and end 224. Sleeve 226 has threads thereon which are mated with the threads on plunger 208. If it is desired to increase the distance between the vacuum seat 104 and face 125 on poppet 117 when the control valve 656 is in the fully released position, as shown in FIG. 14, a shim or disc 650 having the same diameter as sleeve 226 is located adjacent shoulder 228 to move rib 238 a further distance from shoulder 240. When the moving effect of spring 234 on plunger 208 terminates with disc 232 moving away from shoulder 244, the deformed disc 60 can move plunger 208 and poppet 117 a further distance before rib 238 engages stop or shoulder 240 on hub 78.

Similarly, if the position of the control valve 656 in the rest position needs to be adjusted, the thickness of shim 650 can be increased or decreased in order to assure that the desired free communication ay occur between chambers 86 and 88 by way of passage 94, bore 90 and passage 96 in the rest position.

The four distinct operational positions for control valve 656 are shown in FIGS. 11, 12, 13 and 14.

In FIG. 11, the control valve 656 is in the rest position with chambers 86 and 88 connected to each other by way of passage 94, bore 90 and passage 96. Spring 234 acts on plunger 208 to hold face 125 at a preset clearance from vacuum seat 104 to provide free communication between the front and rear chambers 86 and 88.

Initially, an input force from push rod 54 moves plunger 208 toward disc 60. In moving from the rest position, spring 126 urges end 125 of poppet 117 into engagement with vacuum seat 104 to interrupt fluid communication through passage 94. At the same time face 109 and face 125 are still in contact to produce the lap or static position shown in FIG. 12.

Figure 13:
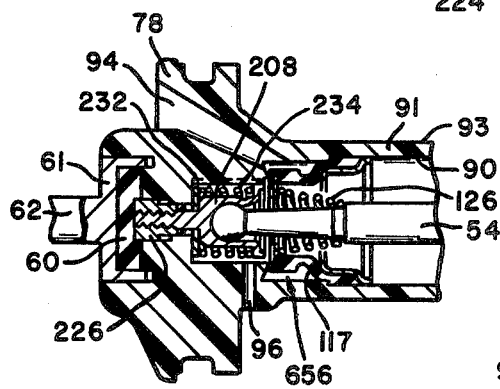
FIG. 13 is a sectional view of the control valve of FIG. 11 in an actuation position.

Further movement of plunger 208 moves face 109 away from end 125 as shown in FIG. 13, to allow air to flow from bore 90 into chamber 88 by way of passage 96. This input force moves end 224 and sleeve 226 into disc 60. At the same time, a pressure differential between air in chamber 88 and vacuum in chamber 86 develops. This pressure differential acts on wall 58 to develop a force that overcomes spring 52 and moves the wall 58 toward the front chamber 86. The force developed across wall 58 is carried into hub 78 and through disc 60 to output push rod 62. The resistance to movement by pistons in master cylinder 44 creates a reactionary force that is carried back into the disc 60. The reactionary force acts on end 224 and sleeve 226 to balance the input force and thereafter move the plunger back to the lap position shown in FIG. 12.

On termination of the input force, spring 234 and the reactionary force carried through deformed disc 60 moves plunger 208 and poppet 117 to the fully released position shown in FIG. 14. The clearance between face 125 on poppet 117 and vacuum seat 104 is large and thus the fluid pressure in chambers 86 and 88 rapidly equalizes to allow the return spring 59 to urge wall 58 toward the rear shell 66. The flow path developed between chambers 86 and 88 which allows vacuum to evacuate air from chamber 88 is such that by the time wall 58 reaches the rear shell 66 the pressure in these chambers is equalized. As the reaction force is reduced, spring 234 moves disc 232 into engagement with him 650 to fix the position of the disc 232 with respect to seat 125 on plunger 208. Thereafter, a pressure differential develops across plunger 208 and poppet 117 between the vacuum available in passage 94 and air in bore 90. This pressure differential acts on poppet 117 and plunger 208 to move plunger 208 toward disc 60 until disc 232 engages shoulder 244 to establish the rest position illustrated in FIG. 11.

Thereafter, the control valve 656 need only move from the rest position through the lap position in order to be in an actuation position to effect a brake application.

I claim:

1. A retainer for holding a control valve of a servomotor in a bore of a hub, said hub being attached to a movable wall that separates the interior of the servomotor into a first chamber and a second chamber, said control valve engaging said retainer to establish a full release position whereby the first and second chambers are connected to each other to allow the fluid pressure therein to equalize, said control valve having an actuation position whereby the second chamber is connected to a source of fluid under pressure to develop a pressure differential across the movable wall and produce an output force corresponding to an input force applied to the control valve characterized by said retainer cooperating with said hub to permit said control valve to move from the full release position to a fixed rest position adjacent the actuation position to reduce the valve travel required to reach the actuation position in response to the input force;

said control valve having a plunger with a first end and a second end, said first end being connected to receive a reaction force corresponding to the output force;

an input member connected to said second end of said plunger;

a poppet located in said bore and having a first end secured to said hub and a second end free to move within said bore;

a first spring for urging said plunger toward the full release and rest positions;

a second spring for urging said free end of the poppet into engagement with said second end of said plunger during the full release and rest positions and with a seat on the hub on movement of the plunger to the actuation position;

said retainer having a cylindrical body fixed to the plunger adjacent said first end, said cylindrical body having a rib on the peripheral surface thereof that engages a first shoulder on the hub to limit the movement of the plunger in establishing said full release position; and a disc located on said plunger and urged into engagement with said cylindrical body by said first spring, said disc engaging a second shoulder on said hub on movement of the plunger to the fixed rest position to assure continued fluid communication between the first and second chambers in order that the fluid pressure therein remains equal.

2. In the servomotor, as recited in claim 1 wherein the plunger means remains in the full release position until a pressure differential created across the plunger and poppet moves the disc into engagement with the second shoulder to position the plunger in the rest position.

3. The servomotor as recited in claim 1 wherein said input force applied to said plunger overcomes said second resilient member to move the plunger to the actuation position.

4. The servomotor as recited in claim 3 wherein said retainer further includes:

means for adjusting the relationship between the control valve and hub to assure that the first chamber and second chamber are freely connected in the fixed rest position.

5. A servomotor comprising:

a housing with a cavity therein;

a movable wall for dividing said cavity into a first chamber and a second chamber;

a hub connected to said movable wall having a bore therein, said hub having first and second passages for connecting the bore with the first and second chambers, respectively;

a first resilient member for urging the movable wall toward the second chamber;

a control valve located in said bore having a plunger and poppet member, said plunger and poppet having a full release position whereby the first and second chambers are connected to each other to equalize the fluid pressure therein, an actuation position where the second chamber is connected to a source of fluid under pressure through the bore and second passage, a static position where communication from the bore to both the first and second chambers is interrupted, and a fixed rest position adjacent the actuation position where said first and second chambers are connected;

an output member connected to the movable wall;

an input member responsive to an input force for moving said plunger from said fixed rest position to the actuation position to create a pressure differential across the movable wall between the fluid in the first and second chambers, said pressure differential acting on and moving the movable wall to overcoming said first resilient member to provide said output member with an output force, the resistance to movement of the output member providing a reaction force, said reaction force moving said plunger toward said poppet, said static position occuring when said reaction force is balanced with said input force, said reaction force moving the plunger and poppet member to the full release position on initial termination of said input force; and retainer means having a cylindrical member connected to said plunger, said cylindrical member engaging a first stop to limit the movement of the control valve by the reaction force to establish the full release position, said reaction force terminating as the fluid pressure in the first and second chambers equalizes as said first resilient member returns the movable wall toward the second chamber, said retainer means having a disc that surrounds said plunger and a second resilient member, said second resilient member urging said disc toward a fixed position with respect to said plunger, said source of fluid under pressure in said bore acting on said poppet and plunger by moving said plunger until said disc engages a second stop to establish said fixed rest position, said second resilient member opposing further movement of said plunger to maintain said fixed rest position in the absence of an input force.

6. The servomotor, as recited in claim 5 wherein said retainer means further includes:

a third resilient member acting on said plunger for assisting said source of fluid under pressure acting on said poppet in urging said plunger to the rest position.

7. The servomotor as recited in claim 5 wherein said input force applied to said plunger overcomes said second resilient member to move the plunger and poppet to the actuation position.

8. The servomotor as recited in claim 7 wherein said retainer means further includes:

means for adjusting the relationship between said plunger and disc to assure that the first chamber and second chamber are freely connected in the fixed rest position.

* * * * *